United States Patent
Wallrafen

(10) Patent No.: US 9,410,788 B2
(45) Date of Patent: Aug. 9, 2016

(54) MAGNETIC LENGTH MEASURING SYSTEM, LENGTH MEASURING METHOD AND METHOD FOR PRODUCING A MAGNETIC LENGTH MEASURING SYSTEM

(75) Inventor: Werner Wallrafen, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 759 days.

(21) Appl. No.: 13/695,520

(22) PCT Filed: Apr. 29, 2011

(86) PCT No.: PCT/EP2011/056814
§ 371 (c)(1),
(2), (4) Date: Jan. 22, 2013

(87) PCT Pub. No.: WO2011/135063
PCT Pub. Date: Nov. 3, 2011

(65) Prior Publication Data
US 2013/0113469 A1    May 9, 2013

(30) Foreign Application Priority Data
Apr. 30, 2010   (DE) .......................... 10 2010 019 077

(51) Int. Cl.
G01B 7/14 (2006.01)
G01B 7/04 (2006.01)
G01D 5/14 (2006.01)

(52) U.S. Cl.
CPC ................ G01B 7/046 (2013.01); G01D 5/145 (2013.01)

(58) Field of Classification Search
CPC ........... G01B 7/046; G01B 7/02; G01D 5/145

USPC ........................... 324/207.23, 207.24, 207.25
See application file for complete search history.

(56) References Cited

U.S. PATENT DOCUMENTS

| | | |
|---|---|---|
| 2,981,885 A | 4/1961 | Schonstedt |
| 4,810,965 A | 3/1989 | Fujiwara et al. |
| 4,879,555 A | 11/1989 | Ichikawa et al. |
| 5,006,806 A | 4/1991 | Rippingale et al. |
| 5,668,331 A | 9/1997 | Schintag et al. |
| 6,433,537 B1 | 8/2002 | Petersen |
| 6,545,463 B1 | 4/2003 | Dettmann et al. |
| 6,823,725 B2 | 11/2004 | Lohberg |
| 7,119,534 B2 | 10/2006 | Butzmann |
| 2010/0045275 A1 | 2/2010 | Frachon |

(Continued)

FOREIGN PATENT DOCUMENTS

| | | |
|---|---|---|
| DE | 690 14 521 | 6/1995 |
| DE | 44 38 715 V1 | 5/1996 |

(Continued)

*Primary Examiner* — Daniel Miller
(74) *Attorney, Agent, or Firm* — Cozen O'Connor

(57) ABSTRACT

A length measuring system includes a magnetic component having two helical magnetically conductive or magnetic elements which have first and second axial ends. The elements are arranged in an axially symmetrically manner relative each other along a common longitudinal axis such that a magnetic field can be formed between the elements, the angle of the field relative to the common longitudinal axis continuously rotating along a predetermined length. The length measuring system further includes a magnetic sensor which can be arranged between the two elements at a right angle to the common longitudinal axis of the elements and which is connected to an evaluation unit.

18 Claims, 2 Drawing Sheets

(56) References Cited

U.S. PATENT DOCUMENTS

| | | |
|---|---|---|
| 2010/0231205 A1 | 9/2010 | Jerance et al. |
| 2012/0161755 A1 | 6/2012 | Masson et al. |

FOREIGN PATENT DOCUMENTS

| | | |
|---|---|---|
| DE | 195 30 386 A1 | 2/1997 |
| DE | 198 36 599 A1 | 2/2000 |
| DE | 199 10 636 | 9/2000 |
| DE | 199 10 636 A1 | 9/2000 |
| DE | 100 10 042 A1 | 7/2001 |
| DE | 101 62 849 B4 | 11/2007 |
| EP | 0 212 406 | 3/1987 |
| EP | 0 212 406 A2 | 3/1987 |
| EP | 0 997 706 | 5/2000 |
| EP | 0 997 706 B1 | 8/2002 |
| EP | 1 290 403 A1 | 3/2003 |
| EP | 2 084 496 A2 | 8/2009 |
| JP | 55-122102 | 9/1980 |
| JP | 62-35202 | 2/1987 |
| JP | 63-231201 | 9/1988 |
| JP | 02-222112 | 9/1990 |
| JP | 03-44670 | 2/1991 |
| JP | 03-076104 | 4/1991 |
| JP | 03-504646 | 10/1991 |
| JP | 04-323501 | 11/1992 |
| JP | 07-49245 | 2/1995 |
| JP | 07-260408 | 10/1995 |
| JP | 3030255 | 10/1996 |
| JP | 08-285510 | 11/1996 |
| JP | 09-072426 | 3/1997 |
| JP | 2000-131006 | 5/2000 |
| JP | 2003-524778 | 8/2003 |
| JP | 2005-223035 | 8/2005 |
| JP | 2007-101299 | 4/2007 |
| WO | WO 2007/099238 A1 | 9/2007 |
| WO | WO 2008/071875 A2 | 6/2008 |
| WO | WO 2009/101270 A2 | 8/2009 |

MAGNETIC LENGTH MEASURING SYSTEM, LENGTH MEASURING METHOD AND METHOD FOR PRODUCING A MAGNETIC LENGTH MEASURING SYSTEM

CROSS REFERENCE TO RELATED APPLICATIONS

This is a U.S. national stage of application No. PCT/EP2011/056814, filed on Apr. 29, 2011. Priority is claimed on German Application No. 10 2010 019 077.2, filed Apr. 30, 2010, the content of which is incorporated here by reference.

BACKGROUND OF THE INVENTION

1. Field of the Invention

The present invention relates to a magnetic component for a magnetic length measuring system, a magnetic length measuring system, a length measuring method with a magnetic length measuring system and a production method for a magnetic component for a magnetic length measuring system.

Various methods are known for realizing linear travel measurements. Compared to other methods, magnetically based methods for linear travel measurement have high cross sensitivity with respect to distance changes, temperature changes, and magnetic field strength changes. Therefore, an idea that appears repeatedly is to realize a linear travel measurement using a magnetoresistive angle sensor. Currently there are no cost-effective solution concepts available that satisfy the requirements of accuracy. Furthermore, known stray field-based measuring systems are sensitive to external interference magnetic fields.

An arrangement for measuring a relative linear position is known from EP 0 997 706 B1. The arrangement serves for measuring a relative linear position between a sensor and a magnetic body, with the position relative to each other being linearly adjustable in a predetermined direction. The sensor is embodied as magnetoresistive angle sensor and a magnetic strip is provided as magnetic body. The magnetic strip has a magnetic-pole pair and a magnetic field running at varying angles over the length of said strip; this magnetic field can be visualized by appropriate magnetic field lines. An angle of the magnetic field passing through the magnetoresistive angle sensor is dependent on the relative position of the magnetoresistive angle sensor with respect to the magnetic strip. The respective relative position can be determined from the output signal of the magnetoresistive angle sensor.

Furthermore, DE 199 10 636 A1 discloses a length measuring system that consists of one or more magnetic measuring rods. In at least one measuring rod of the length measuring system the magnetization direction lies in the plane of the cross section thereof, which is perpendicular to the measuring direction, and forms a magnetization pattern. The magnetization of the cross section is homogeneous in a simple case. The magnetization pattern is increasingly twisted with respect to the one at the start of the measuring rod when there is an advance in the measuring direction. The magnetization leads to a magnetic field, the direction of which is likewise continuously rotated with an advance in the measuring direction. The angle of the magnetic field present in the respective position is determined using at least one magnetic field sensor responsive to the direction of the magnetic field, said angle can be uniquely assigned to the position for many different variants of the length measuring system.

The utilized measuring rod is a solid rod magnet with a rotating magnetization. The sensor is situated at a predetermined distance parallel to the longitudinal axis of the rod magnet. The sensor is therefore arranged at such a distance from the rod magnet that it is moved in a region of maximum strength of the magnetic stray field of the rod magnet.

A disadvantage of the arrangements as per the prior art is that it is necessary to realize a magnetization with changing angle along the length of the magnet. The arrangement according to the first example in particular was never implemented because the magnetization cannot be brought about by using known means.

When using a rod magnet, as in DE 199 10 636 A1, it likewise proves impossible to create a continuous, precisely rotating magnetization, particularly at the ends of the rod. The upshot of this is that a measurement using this arrangement is imprecise as a result of the not sufficiently continuously rotated magnetization.

A further disadvantage lies in the fact that the accuracy of the arrangements according to the prior art is dependent on the field homogeneity in the stray field and hence on the distance between the sensor and the magnet. Thus there is an optimum on an axis, lying parallel to the longitudinal axis of the magnet, for the sensor on which a measurement has to be performed. The arrangements as per the prior art accordingly operate using a magnetically inhomogeneous stray field outside of the magnet. As a result of this, the arrangements are very sensitive to external influences, in particular to external interference magnetic fields. This can lead to further imprecision in the measurement.

The field strength moreover also varies as a function of the measuring position. Therefore the rod magnet needs to create correspondingly higher magnetic field strengths for reliable saturation of the sensors.

Furthermore, twisting of the rod magnet as per DE 199 10 636 A1 can over time lead to an accurate measurement no longer being provided. By way of example, the rod magnet can detach from an anchoring over time and rotate along the longitudinal axis thereof. A further disadvantage of the arrangement is that the rod magnet with the rotating magnetization is expensive.

SUMMARY OF THE INVENTION

An object of the present invention therefore lies in optimizing a magnetic length measuring system compared to the prior art and in providing an appropriate length measuring method and production method for a magnetic component of a length measuring system.

A magnetic component for a magnetic length measuring system comprises a first helical element that is magnetically conductive or magnetic with a first and a second axial end and a second helical element that is magnetically conductive or magnetic with a first and a second axial end. The first and the second helical elements are arranged in an axially symmetric manner relative to each other along a common longitudinal axis such that a magnetic field can be formed between the first and the second helical elements, the angle of said magnetic field relative to the common longitudinal axis continuously rotating along a predeterminable length.

In the magnetic length measuring system, the magnetic component is used together with a magnetic sensor guided between the first and the second magnetically conductive or magnetic elements. In an idealized case, a homogeneous magnetic field forms between the first and the second helical elements. In the following text, the region between the first and the second helical elements is referred to as the interior of the magnetic component.

As a result of the helical shape of the two elements, the magnetic field rotates about the longitudinal axis of the interior of the magnetic component, when considered in the longitudinal direction. The rotating magnetic field between the two elements is achieved solely as a result of the geometry and the arrangement of the two elements. The helical shape of the elements and the arrangement thereof about the common longitudinal axis furthermore results in the magnetic component for example having a pipe-shaped design. The two magnetic elements are therefore, at a predeterminable distance from the common longitudinal axis, arranged on the outside of an imagined e.g. pipe shape about the common longitudinal axis, as a result of which the aforementioned component interior is formed. This applies to at least one region of the component in which the magnetically conductive or magnetic elements are present in a helical shape or in the form of a helix.

A precise embodiment of the two magnetically conductive or magnetic elements in view of width, thickness and length is respectively dependent on the overall proportions of the magnetic component and the respective application. In particular, the proportions of the two magnetically conductive or magnetic elements are selected such that a maximum magnetic field concentration is obtained between the two elements. By way of example, the two magnetically conductive or magnetic elements extend in a circumferential direction over a quarter or a third (90° or 120°) of the imagined circumference about the common longitudinal axis. One length of the two magnetically conductive or magnetic elements for example lies between 20 mm and 200 mm. Furthermore, the two magnetically conductive or magnetic elements are matched to one another, i.e. preferably have the same width, the same length and the same thickness, i.e. it follows that they are axis symmetrical. The two elements furthermore run parallel to one another. The two magnetically conductive or magnetic elements in particular have an elongate design.

In addition to the helical shape of the magnetically conductive or magnetic elements, these elements can also have a straight section in a start or finish region. Straight means that the elements run parallel to each other and to the common longitudinal axis. This straight section is preferably situated at one of the axial ends. In this straight section, the elements can furthermore have the curvature of the pipe-shaped component or they can be flattened.

The common longitudinal axis is preferably a straight line. However, the common longitudinal axis can be a curved longitudinal axis. This is how a bent form of the magnetic component is achieved should this be required for a specific application. In this case, the magnetic sensor is likewise guided between the two magnetic elements, but along or adjacent to the curved longitudinal axis.

An advantage of the magnetic component according to one embodiment of the invention is that the magnetic sensor is guided in an interior of the component during operation in a length measuring system. In doing so, the magnetic sensor is effectively shielded from external interference magnetic fields. Furthermore, the sensor is situated in a homogeneous magnetic field so it can be arranged as desired in the interior and need not be arranged along the common longitudinal axis of the magnetic elements. Moreover, the magnetic field strength remains largely constant over the measuring length.

Furthermore, the costs associated with the magnetic component are lower because unlike the prior art there is no rotating magnetization. Since the rotation of the magnetic field is solely caused by the helical shape of the magnetically conductive or magnetic elements, the magnetic component according to one embodiment of the invention enables accurate measuring as a result of the homogeneous magnetic field. A more cost-effective production compared to the prior art can be realized.

It should be mentioned as a disadvantage of the arrangement compared to the prior art that the double length of the measuring path is required for the installation when operated in a length measuring system, provided that the magnetic sensor is not operated with a flexible electrical connection. The magnetoresistive angle sensor and the magnet are arranged parallel to one another in the prior art. The axial length of the magnet corresponds approximately to the maximum measuring path and to the maximum spatial requirements in the axial direction. However, according to the present invention, the magnetic sensor is arranged in the interior of the magnetic component. In an exemplary case, the sensor is situated at the first axial end of the component in a first state. Now there is a change in the relative position between the component and the magnetic sensor and the sensor is situated at the second axial end of the component in a second state. Hence there are greater spatial requirements in the axial direction. By way of example, these spatial requirements are double the axial length of the magnetic component.

In a preferred embodiment, the first end of the first magnetically conductive element and the first end of the second magnetically conductive element are connected by a permanent magnet. The two magnetically conductive elements are pole laminations in particular. The pole laminations preferably comprise a ferrous material. However, it is possible to use any magnetic material which is not permanently magnetic.

The first axial ends of the two magnetically conductive elements are arranged adjacently to the permanent magnet. By way of example, the permanent magnet can be two permanent magnets having one pole. Alternatively, the permanent magnet can be a permanent magnet having two poles, with this being discussed in more detail later. Respectively one pole of the permanent magnet is associated with a magnetically conductive element, i.e. a pole lamination.

A gap can be present between the two pole laminations and the permanent magnet or magnets, wherein the pole laminations should be arranged as closely as possible to the respective permanent magnet. In particular, the pole laminations are adhesively bonded to the permanent magnet or arranged thereon by insert molding.

The permanent magnet or magnets can be circular or cuboid. If the permanent magnet is cuboid, the magnetically conductive element preferably has the flattened straight region described above. There is such a connection between the permanent magnet and the respective pole lamination that there can be a maximum magnetic field transfer between the permanent magnet and the pole laminations. It is for this reason that the permanent magnet is arranged adjacent to the respective pole lamination, for example at the first axial end of the component in the interior of the component.

In a further preferred embodiment, the permanent magnet is a permanent magnet having two poles, whereas a first pole of the permanent magnet having two poles is arranged adjacent to the first axial end of the first magnetically conductive element and a second pole of the permanent magnet having two poles is arranged adjacent to the first axial end of the second magnetically conductive element. The permanent magnet having two poles can, as mentioned above, have a circular or cuboid shape. The permanent magnet having two poles in particular consists of a ferromagnetic material and is inserted into the opening at the first axial end or partially arranged therein. The permanent magnet preferably terminates flush with the first axial end of the first and of the second magnetic elements. Alternatively, the permanent magnet can also be arranged externally adjacent to the first axial end of the magnetic component. An advantage of this arrangement is that the component is closed on this side and a large volume is available for the permanent magnet.

In an alternative embodiment, the first and the second magnetic elements are magnetized so as to have two poles. In contrast to the use of two pole laminations with one permanent magnet, the magnet elements having two poles enable the component to be open at both ends. However, one end of the component can be closed by a polymer cover. As an alternative to the polymer cover, any non-magnetic material can be used to close the component at the first axial end thereof. The forms and arrangement of this cover correspond to those which were described above for the permanent magnet. Since no permanent magnet is used at either axial end of the component in this arrangement, this arrangement has no stray fields caused by the permanent magnet at the first end of the magnetic component. Hence the measurement becomes even more precise.

It is furthermore preferable that the magnetic component comprises a non-magnetic substrate on which the first and the second magnetically conductive or magnetic elements are arranged. In the case where the magnetic component is closed off at one axial end by a polymer cover or a permanent magnet or in another fashion, the pole laminations or the magnetic elements can be arranged thereon. Then no further material is required on the circumference between or next to the two magnetic elements. Hence air can be present circumferentially between or next to the two elements.

In other cases, the non-magnetic substrate is situated between or next to the magnetically conductive or magnetic elements. In this case, this is a non-magnetic material such as e.g. aluminum. However, a polymer is preferred as substrate. This is how the mechanical stability of the magnetic component is increased further. Furthermore, the cover for terminating the first end can be integrally produced from this substrate. The magnetic component therefore has a pan-shaped or pipe-shaped design.

In a particularly advantageous embodiment, the first and the second magnetically conductive or magnetic elements are arranged opposite each other in an axially symmetrical manner. The circumferential distance between the two elements is therefore always the same and axis symmetrical. This allows a particularly accurate measurement to be realized.

It is furthermore preferable for the first and the second magnetically conductive or magnetic elements to be along the length thereof twisted by between 45° and 360°, in particular by approximately 180°, about the common longitudinal axis. The so-called twist angle in particular depends on the type of utilized magnetic sensor; this will be discussed in detail below. The rotation furthermore depends on the length and the desired precision of the measurement.

A length measuring system comprises a magnetic component according to the invention and a magnetic sensor, which can be arranged between the first and the second helical magnetically conductive or magnetic elements, perpendicular to the common longitudinal axis of the first and of the second magnetically conductive or magnetic elements, and is connected to an evaluation unit such that the magnetic component and the magnetic sensor can move relative to one another.

As already presented above, the magnetic sensor is situated in an interior of the magnetic component. During a measurement, the magnetic component and the magnetic sensor are moved relative to one another. Any sensor that can detect an angular change in a magnetic field is suitable as a magnetic sensor.

As a result of the homogeneous field in the interior of the magnetic component, it is not mandatory to arrange the magnetic sensor on the common longitudinal axis of the helical magnetically conductive or magnetic elements. Hence there are no measurement errors during operation if the magnetic sensor deviates from the common longitudinal axis of the two elements. The advantages of the length measuring system according to the invention emerge from the above-described advantages of the magnetic component according to embodiment of the invention.

In a preferred embodiment, the magnetic sensor and the evaluation unit are surrounded by a non-magnetic housing material with an external diameter that is less than an internal diameter of the magnetic component. In particular, a non-magnetic housing material can be cast around the magnetic sensor and the evaluation unit. By way of example, this non-magnetic material can be a polymer.

It is furthermore advantageous if the magnetic sensor, the evaluation unit, and the utilized electric leads are produced from a non-magnetic material, which can minimize false measurements as a result of interference fields.

The diameter of the housing material surrounding the magnetic sensor and the evaluation unit can be selected such that there is a predeterminable gap between the external diameter of the housing material enveloping the magnetic sensor and the internal diameter of the pipe-shaped component. As illustrated above, as a result of the homogeneous magnetic field in the interior of the component in particular, accurate guidance along the common longitudinal axis of the elements is not mandatory, although it is desirable. Furthermore, enveloping the magnetic sensor and the evaluation unit ensures a greater mechanical stability of the magnetic sensor arrangement.

In a particularly preferred embodiment, the magnetic sensor is a magnetoresistive angle sensor, in particular an anisotropic magnetoresistive angle sensor (AMR angle sensor), a giant magnetoresistive angle sensor (GMR angle sensor), or a 2D-Hall sensor. The twist of the two magnetically conductive or magnetic elements along the common longitudinal axis is at most approximately 180°, particularly if an AMR angle sensor is used. Here, approximately means that the twist is selected such that, in particular, the magnetic sensor can detect an actual angle twist of 180° in a subsequent measuring method. Hence, this can result in an actual twist of the two magnetically conductive or magnetic elements about approximately 200° because the magnetic sensor cannot measure accurately from beginning to end. In this example, the first and the last 10° of twist cannot be detected in a meaningful way by the magnetic sensor, particularly as a result of a permanent magnet arranged adjacently to the first axial end. The increased actual twist can also emerge as a result of calibration processes. Alternatively, the actual twist for example is 180°, with the twist only being measured in a region between 10° and 170°. However, the measuring region of the available path length is reduced as a result, while the length of the component remains unchanged.

In the case of a GMR angle sensor, unlike an AMR angle sensor, the twist of the two magnetically conductive or magnetic elements can be approximately 360°. In this case too, the actual twist can be 380° in order to obtain a maximally detectable twist of 360°.

A length measuring method with a length measuring system according to one embodiment of the invention comprises the steps of: moving the magnetic component and the magnetic sensor relative to one another, detecting a magnetic field angle change by the magnetic sensor between the first and the second helical magnetically conductive or magnetic elements and evaluating the detected magnetic field angle change to form a travel signal. The length measuring method according to the invention has the advantages of the above-described magnetic component and of the above-described magnetic length measuring system. The magnetic sensor is arranged in the interior of the magnetic component and, there, there is a relative movement between the component and the magnetic sensor. As a result of this arrangement, as already explained above, the double path length is required for the measuring device, provided that there is no flexible electrical connection.

It is particularly preferable for the magnetic component to be moved while the magnetic sensor with the evaluation unit is arranged in stationary fashion. In this case, the electric leads of the magnetic sensor and of the evaluation unit can be fixedly arranged and need not have a flexible design. This simplifies the design of the arrangement. The magnetic sensor is used to detect a magnetic field rotation, as described above. In particular, this is a centric angular change in the magnetic field. The magnetic sensor transmits electrical signals to the evaluation unit which can establish at least one angle rotation, preferably an absolute angle, from the signals.

A production method for a magnetic component according to one embodiment of the invention comprises the following steps: providing a first and a second helical and magnetically conductive or magnetizable element with a first and a second axial end and arranging the first and the second magnetically conductive or magnetizable elements parallel to one another along a common longitudinal axis such that a magnetic field can be formed between the first and the second magnetically conductive or magnetizable elements, the angle of said magnetic field relative to the common longitudinal axis continuously rotating along a predeterminable length.

The magnetic component according to one embodiment of the invention, which has the aforementioned advantages, can be produced using the production method. The magnetically conductive or magnetizable elements can be provided by stamping in the case of an initial strip stock. By way of example, the basic geometry of the magnetically conductive or magnetizable elements has previously been punched. In the case of the production of the magnetically conductive or magnetizable elements from a pipe, this case can be brought about by milling, lasing or punching. If pole laminations are used, the same element is produced in each case.

If use is made of two magnetic elements, it is also possible to produce two magnetic elements that are the same; however, these are magnetized with different polarity because, during later use, respectively two different poles must point in the direction of the common longitudinal axis. This is necessary, in particular, if magnetic elements having two poles are used.

In a preferred embodiment, the provision of the first and of the second magnetically conductive or magnetizable elements is brought about by means of stamping, punching, injection molding, or laser cutting.

It is furthermore advantageous if the first and the second magnetically conductive or magnetizable elements are formed from polymer-bound ferrite material in an injection-molding process. Alternatively, the first and the second magnetically conductive or magnetizable elements can be formed from hard ferrite in a sintering process.

Furthermore, if the first and the second elements are magnetically conductive elements, it is preferable for the production method to comprise the following step: arranging a permanent magnet adjacent to the first axial end of the first and of the second magnetically conductive elements, wherein the first and the second magnetically conductive elements are a first and a second pole lamination. This is one manner by which the above-described first embodiment with two pole laminations and two permanent magnets having one pole or one permanent magnet having two poles can be realized. The pole laminations can be arranged on the permanent magnet by adhesive bonding or insert molding.

In a furthermore preferred embodiment, the production method comprises the further step of: arranging the first and the second magnetically conductive or magnetizable elements on a non-magnetic substrate. This is one manner by which the component is closed around the circumference, as a result of which the component has increased mechanical stability. The magnetically conductive or magnetizable elements can be encapsulated by a polymer, adhesively bonded into a polymer pipe, or clipped into the polymer. If use is made of a permanent magnet, the permanent magnet can likewise be encapsulated as well such that there is no need to additionally adhesively bond the pole laminations to respectively one pole of the permanent magnet, although this can nevertheless be carried out.

BRIEF DESCRIPTION OF THE DRAWINGS

In the following text, the present invention will be described in detail on the basis of exemplary embodiments, with reference to the appended drawings. The same reference signs in the drawings respectively denote equivalent elements or components. In detail.

DETAILED DESCRIPTION OF THE PREFERRED EMBODIMENTS

Magnetic length measuring systems are used for linear travel measurement. By way of example, a linear travel measurement for motor vehicles can be used to measure compression travel between body and running gear or wheel. Moreover, it is possible to determine positions of linear actuators.

Figure 1:
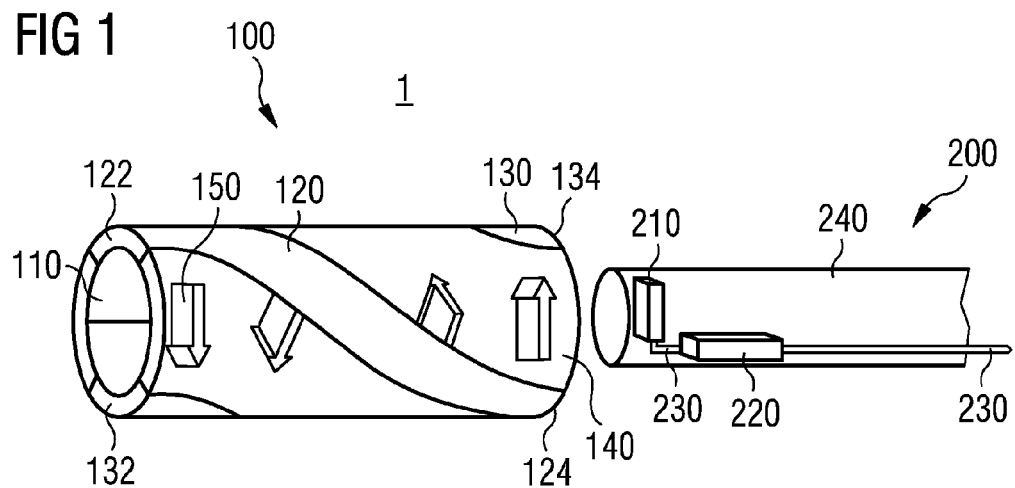
FIG. 1 is a schematic illustration of a magnetic length measuring system.

FIG. 1 is a first embodiment of the length measuring system 1. The length measuring system 1 comprises of a magnetic component 100 and a magnetic sensor arrangement 200.

The magnetic component 100 comprises a permanent magnet 110 and a first magnetically conductive element in the form of a first pole lamination 120 and a second magnetically conductive element in the form of a second pole lamination 130. The two pole laminations 120 and 130 each have a helical shape, are elongate, and have a first axial end 122, 132 and a second axial end 124, 134. The pole laminations 120, 130 are produced from a material with good magnetic-conductive properties but without permanent-magnetic properties.

The permanent magnet 110 is a two-pole, circular permanent magnet. According to FIG. 1, a first pole is situated in the upper half of the permanent magnet 110 and a second pole is situated in the lower half thereof. Arranged centrally on the first pole half is the first pole lamination 120 on the permanent magnet, for example by adhesive bonding. Correspondingly, arranged centrally on the second pole is the second pole lamination 130. This is how the two pole laminations 120, 130 are precisely opposite one another. The two pole laminations 120, 130 have a width of approximately between a quarter and a third of the circle circumference, i.e. between 90° and 120° of the circle circumference.

Hence each pole lamination has one pole or represents one pole. A magnetic field is formed between the two pole laminations 120, 130. As a result of the helical shape of the pole lamination 120, 130, the magnetic field rotates along one length of the component 100 as illustrated by the arrows 150.

Arranged on the circumference between the pole laminations 120, 130 there is a non-magnetic substrate 140, which is referred to as filler material 140 below. By way of example, the filler material 140 is a polymer but can be any non-magnetic material. According to the illustration in FIG. 1, the filler material 140 has at least a thickness corresponding to the thickness of the pole laminations 120, 130. Furthermore, the filler material 140 extends along the length of the component 100 such that the filler material 140 terminates flush with the first axial ends 122, 132 and with the second axial ends 124, 134 of the two pole laminations 120, 130.

In FIG. 1, the permanent magnet 110 closes off the opening of the component 100 at the first axial end and terminates flush with the end of the pole laminations 120, 130. A thickness of the permanent magnet 110 can correspond to or be less than the diameter thereof. The magnetic component 100 is open at the second axial end such that a magnetic sensor arrangement 200 can be inserted, as described below.

The magnetic sensor arrangement 200 comprises a magnetic sensor 210, an evaluation unit 220 and electric leads 230. The magnetic sensor 210 is arranged perpendicular to a longitudinal axis of the component 100. Both the magnetic sensor 210 and the evaluation unit 220 are surrounded, e.g. encapsulated, by an electrically insulating housing material 240. The housing material is preferably likewise a non-magnetic material 240, for example a polymer. The housing material 240 has an external form that fits into the interior of the component 100. By way of example, the housing material 240 is cylindrical if the component 100 has a pipe-shaped design. Non-magnetic materials are likewise used for the magnetic sensor 210, the evaluation unit 220, and the electric leads 230 to improve measurement precision of the length measuring system 1.

The diameter of the pipe-shaped housing material 240 of the sensor arrangement 200 corresponds at most to an internal diameter of the component 100. This is how the magnetic sensor arrangement 200 can be arranged in the interior of the component 100 and the two components 100, 200 can be displaced relative to one another.

Figure 2:
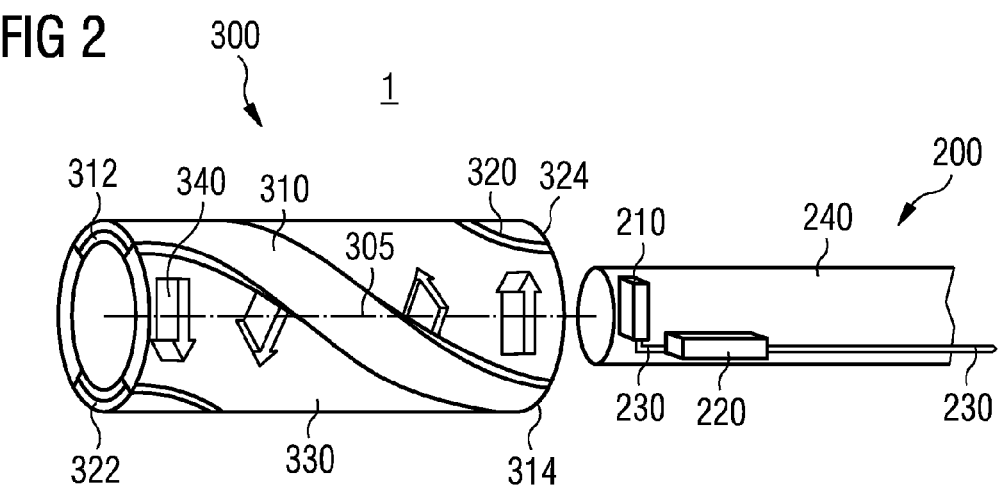
FIG. 2 is a further embodiment of a magnetic length measuring system.

FIG. 2 shows an alternative embodiment of the length measuring system. Herein, the magnetic sensor arrangement 200 corresponds to the magnetic sensor arrangement 200 from FIG. 1. Therefore it is not once again explained in more detail below.

The magnetic component 300 consists of two magnetic elements 310, 320 magnetized so as to have two poles, i.e. of two magnetic elements. Both magnetic elements 310, 320 magnetized so as to have two poles have a first axial end 312, 322 and a second axial end 314, 324. The sides of the two magnetic elements 310, 320 facing one another have the respective complementary pole. This is how, as already described for FIG. 1, a rotating magnetic field is formed between the magnetic elements 310, 320. This is represented by the arrows 340. Arranged along the circumference between the magnetic elements 310, 320 there is a non-magnetic substrate 330, which is referred to as filler material 330 below. The properties of the filler material 330 correspond to those of the filler material 140 in FIG. 1. The geometry of the magnetic elements 310, 320 likewise corresponds to that of the pole laminations 120, 130 and the geometry of the filler material 330 corresponds to that of the filler material 140.

The first axial end of the component 300 can be open or it can be closed off by a polymer cover or a cover made of another non-magnetic material. The first axial end of the component 300 can likewise be integrally closed by the filler material 330 resulting in a pan shape for the component 300. The geometry of the cover preferably corresponds to the geometry from FIG. 1 described for the permanent magnet 110.

Figure 3:
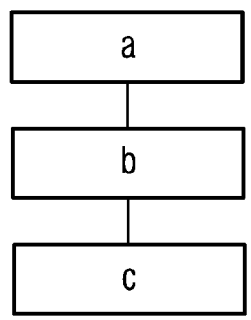
FIG. 3 is a flowchart for a length measuring method.

Now referring to FIG. 3, this explains the length measuring method according to one embodiment of the invention. The magnetic component 100, 300 and the magnetic sensor 210 are moved relative to one another in a step a. In step b, the magnetic sensor 210 detects a magnetic field angle change between the first and the second helical magnetically conductive or magnetic elements 120, 130; 310, 320. In step c, the detected magnetic field angle change is evaluated to form a travel signal. It is possible to use different magnetic sensors depending on the maximum twist of the magnetically conductive or magnetic elements with respect to one another. By way of example, an anisotropic magnetoresistive angle sensor is used in the case of a twist through 180°, as illustrated in FIGS. 1 and 2. In the case of a twist through 360°, use is preferably made of a GMR angle sensor. As an alternative to these two sensors, use can also be made of a 2D-Hall sensor or another magnetically sensitive sensor. All that is important in the utilized magnetic sensors is that they can detect a change in the magnetic field, preferably an angle change.

Figure 4:
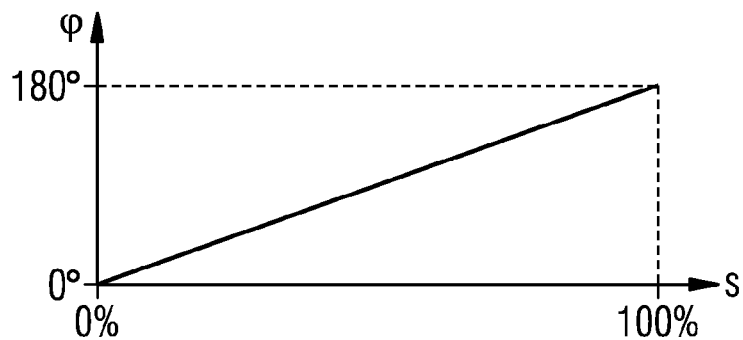
FIG. 4 is a graphic of measured magnetic angular rotation over the relative travel.

FIG. 4 shows the change of the magnetic field angle Φ as a function of the relative path length s. Here, an ideal state has been illustrated. Proceeding from one of the two axial ends, the angle of the magnetic field is 0° and the traveled path length is 0%. If the position of the magnetic sensor 210 in the interior of the magnetic component 100; 300 changes, the angle of the magnetic field also changes. In the illustrated examples, this continues to at most 180°. Thus, an angle of 180° corresponds to the maximum traveled path length of 100%. If a rotation of 360° is used in a GMR angle sensor then the magnetic field angle of 360° corresponds to the path length of 100%. An exemplary path length lies between 50 and 100 mm.

Figure 5:
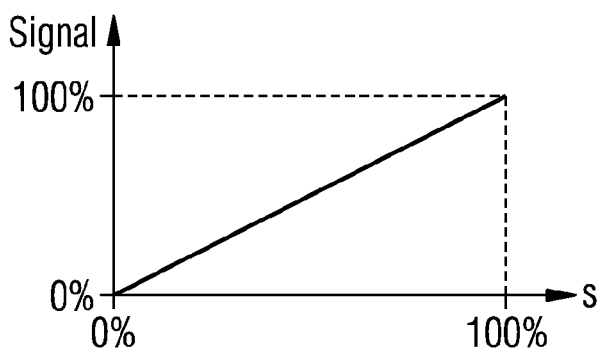
FIG. 5 is a graphic of signal output of the sensor over the relative travel.

FIG. 5 shows the relationship between the signals output by the magnetic sensor 210 and the path length s. According to this, there is a linear relationship between the traveled relative path length s and the signal output by the magnetic sensor 210. A traveled path length of 0% therefore corresponds to a signal of 0%, while a traveled path length of 100% corresponds to an output signal of 100%. However, with reference to FIGS. 1, 2, 4 and 5, depending on the required precision of the measurement or a calibration process, a signal of 0% can correspond to a twist angle of 10°. A signal of 100% can likewise correspond to a twist angle of 170°. As an alternative thereto, the actual twist angle of the magnetically conductive or magnetic elements 120, 130; 310, 320 can also be 200° instead of 180°. Taking into account the aforementioned 10°, by which the measurement is shortened, the result of this is a measurable angle range of 180°. This is how a maximum detection range of the sensor can be used in an optimum fashion if an AMR angle sensor is used.

Figure 6:
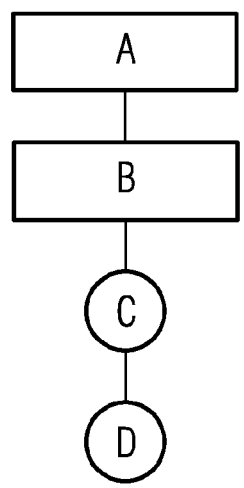
FIG. 6 is a flowchart for a magnetic component for a magnetic length measuring system.

Now referring to FIG. 6, this illustrates a production method according to one embodiment of the invention, for a magnetic component according to the invention. In step A, provision is made for a first and a second elongate, helical magnetically conductive or magnetizable element with a first and a second axial end. Starting from a strip stock, the provision can be brought about by punching and subsequent stamping. The magnetically conductive elements are pole laminations such that it is possible produce two equal elements in each case.

In the magnetizable elements it is necessary to produce two different magnetizations for the two elements because the two complementary poles are opposite one another in each case. In both cases it is possible, instead of strip stock, to use a tube from which the respective elements are punched, milled or lased out. A further production can take place by means of compression molding and subsequent sintering.

In step B, the two elements are arranged in an axially symmetric manner relative to each other along a common longitudinal axis. Hence it is possible to form a magnetic field between the first and the second elements, the angle of which field with respect to the common longitudinal axis continuously changes or rotates along a predeterminable length.

If the two elements are magnetically conductive elements, i.e. pole laminations, then a permanent magnet is arranged adjacent to the first axial ends of the two elements in step C. The form of the permanent magnet was described at the outset with reference to FIG. 1. If there was no insert molding of the pole laminations in step B, this can take place in step C together with the permanent magnets such that the pole laminations do not have to be separately adhesively bonded to the permanent magnets. The sequence of the steps above is exemplary and can be switched.

If use is made of magnetic elements in step B, a polymer cover or a cover made of a non-magnetic material can be arranged at the first axial ends of the two magnetic elements in step C instead of the permanent magnet. By way of example, this can be brought about by adhesive bonding or insert molding. This is how a pan-shaped design of the magnetic component is obtained.

In step D, the two elements are arranged on a non-magnetic substrate. In particular, around the circumference, a filler material is arranged between the elements such that the magnetic component experiences increased mechanical stability. The type and embodiment of the filler material was already discussed in detail in the description of FIGS. 1 and 2, and so this is likewise not repeated here.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A magnetic component for a magnetic length measuring system, comprising:
 a first helical element having a first axial end and a second axial end that is one of:
  magnetically conductive and coupled to a magnet and magnetic; and
 a second helical element having a first axial end and a second axial end that is one of:
  magnetically conductive and coupled to the magnet and magnetic,
 wherein the first helical element and the second helical element are arranged in an axially symmetric manner relative to each other along a common longitudinal axis,
 wherein a width of each of the first helical element and the second helical element is between a quarter and a third of a circumference of a circle formed by the first helical element and the second helical element,
 whereby a magnetic field is formed between the first helical element and the second helical element and an angle of the magnetic field with respect to the common longitudinal axis continuously rotates along a predeterminable length of the common longitudinal axis.

2. The component as claimed in claim 1, wherein the first axial end of the first helical element and the first axial end of the second helical element are connected by a permanent magnet.

3. The component as claimed in claim 2, wherein the permanent magnet is magnetized to have two poles, wherein a first pole of the permanent magnet is arranged adjacent to the first axial end of the first magnetically conductive element and a second pole of the permanent magnet is arranged adjacent to the first axial end of the second helical element.

4. The component as claimed in claim 1, wherein the first helical element and the second helical element are magnetized to have two poles.

5. The component as claimed in claim 1, wherein the first helical element and the second helical element are arranged on a non-magnetic substrate.

6. The component as claimed in claim 1, wherein the first helical element and the second helical element are arranged opposite each other in an axially symmetrical manner.

7. The component as claimed in claim 1, wherein the first helical element and the second helical element are twisted along a longitudinal length between 45° and 360° about the common longitudinal axis.

8. The component as claimed in claim 7, wherein the first helical element and the second helical element are twisted by approximately 180° about the common longitudinal axis.

9. A length measuring system, comprising:
 a magnetic component having:
  a first helical element having a first axial end and a second axial end that is one of:
   magnetically conductive and coupled to a magnet and magnetic; and
  a second helical element having a first axial end and a second axial end that is one of:
   magnetically conductive and coupled to a magnet and magnetic,
   wherein the first helical element and the second helical element are arranged in an axially symmetric manner relative to each other along a common longitudinal axis;
  wherein a width of each of the first helical element and the second helical element is between a quarter and a third of a circumference of a circle formed by the first helical element and the second helical element,
   whereby a magnetic field is formed between the first helical element and the second helical element and an angle of the magnetic field with respect to the common longitudinal axis continuously rotates along a predeterminable length of the common longitudinal axis;
 a magnetic sensor configured to be arranged between the first helical element and the second helical element and perpendicular to the common longitudinal axis; and an evaluation unit connected to the magnetic sensor,
wherein the magnetic component and the magnetic sensor are configured to be moved relative to one another.

10. The length measuring system as claimed in claim 9, wherein the magnetic sensor and the evaluation unit are surrounded by a housing comprising non-magnetic housing material, the housing having an external diameter that is less than an internal diameter of the magnetic component.

11. The length measuring system as claimed in claim 10, wherein the magnetic sensor is a magnetoresistive angle sensor.

12. A length measuring method with the length measuring system as claimed in claim 9, comprising:
 moving the magnetic component and the magnetic sensor relative to one another;
 detecting a magnetic field angle change by the magnetic sensor between the first helical element and the second helical element; and
 evaluating the detected magnetic field angle to form a travel signal.

13. The length measuring system as claimed in claim 11, wherein the magnetic sensor is one of an anisotropic magnetoresistive angle sensor (AMR angle sensor), a GMR angle sensor, and a 2D-Hall sensor.

14. A production method for a magnetic component comprising:
 providing a first helical element and a second helical element that are magnetically conductive, each with a first and a second axial end;
 arranging a two-pole circular permanent magnet adjacent to respective first axial ends of the first helical element and the second helical element,
 wherein the first helical element and the second helical element are a first and a second pole lamination each arrange centrally on a respective pole of the two-pole circular permanent magnet; and
 arranging the first helical element and the second helical element parallel to one another along a common longitudinal axis such that a magnetic field is be formed between the first helical element and the second helical element, an angle of said magnetic field relative to the common longitudinal axis continuously rotating along a predeterminable length.

15. The production method as claimed in claim 14, wherein the first helical element and the second helical element are provided by at least one of stamping, punching, injection molding, or laser cutting.

16. The production method as claimed in claim 14, wherein the first helical element and the second helical element are formed from polymer-bound ferrite material in an injection-molding process.

17. The production method as claimed in claim 14, wherein the first helical element and the second helical element are formed from hard ferrite in a sintering process.

18. The production method as claimed in claim 14, further comprising:
 arranging the first helical element and the second helical element on a non-magnetic substrate.

* * * * *